US010095751B2

(12) United States Patent
Florance et al.

(10) Patent No.: US 10,095,751 B2
(45) Date of Patent: Oct. 9, 2018

(54) BLENDED POLYGON SEARCH

(71) Applicant: CoStar Realty Information, Inc., Washington, DC (US)

(72) Inventors: Andrew Florance, San Francisco, CA (US); Heidemarie W. Williams, Homer Glen, IL (US); Adam Fischer, Mokena, IL (US); Tod Kuwahara, South Pasadena, CA (US)

(73) Assignee: CoStar Realty Information, Inc., Washington, DC (US)

( * ) Notice: Subject to any disclaimer, the term of this patent is extended or adjusted under 35 U.S.C. 154(b) by 285 days.

(21) Appl. No.: 15/043,060

(22) Filed: Feb. 12, 2016

(65) Prior Publication Data

US 2017/0235733 A1 Aug. 17, 2017

(51) Int. Cl.
*G06F 17/30* (2006.01)

(52) U.S. Cl.
CPC .... *G06F 17/3053* (2013.01); *G06F 17/30241* (2013.01)

(58) Field of Classification Search
USPC ........ 707/609, 687, 705, 723, 790, 813, 821
See application file for complete search history.

(56) References Cited

U.S. PATENT DOCUMENTS

| | | | |
|---|---|---|---|
| 8,732,219 B1* | 5/2014 | Ferries | G06F 17/30241 707/723 |
| 9,141,640 B2 | 9/2015 | Tadman | |
| 2010/0094548 A1 | 4/2010 | Tadman | |
| 2013/0339498 A1* | 12/2013 | Johnson | H04W 4/02 709/221 |
| 2014/0351088 A1* | 11/2014 | Saxena | G06Q 30/0613 705/26.41 |
| 2016/0379321 A1* | 12/2016 | Abraham | G06F 3/167 705/26.63 |

* cited by examiner

*Primary Examiner* — Sana A Al-Hashemi
(74) *Attorney, Agent, or Firm* — Fish & Richardson P.C.

(57) ABSTRACT

Methods, systems, and apparatus, including computer programs encoded on computer storage medium, for performing a blend polygon search. In one aspect, the method may include receiving one or more search parameters. Additional actions may include obtaining two or more sets of data that each represent a respective geographic area, the two or more sets of data including at least one set of data that is provided by a third party geographic data set provider, defining a particular geographic area to search based at least on the two or more sets of data that each represent a respective geographic area, identifying one or more entities that (i) are indicated as responsive to one or more of the search parameters, and (ii) are associated with the particular geographic area, and providing a representation of the entities for output.

17 Claims, 3 Drawing Sheets

BLENDED POLYGON SEARCH

FIELD

This specification is generally related to search engines.

BACKGROUND

There are a number of different ways to identify the most relevant search results. For instance, some search engines may identify search results associated with web pages that include the highest number of keyword occurrences. Alternatively, or in addition, some search engines may return search results based on the degree of similarity between one or more query parameters and features of a web page. Alternatively, or in addition, some search engines may provide search results based on the amount of money a content owner paid the operator of the search engine.

Each of these approaches may be used to identify search results in response to a user query. Such techniques may be particularly effective at finding a set of search results that are responsive to a user's query based on one or more parameters. However, sometimes the most relevant search results to a user are not the search results that have the highest correlation to search terms.

SUMMARY OF THE DISCLOSURE

Aspects of the present disclosure may facilitate implementation of a blended polygon search process that enhances the ranking of a particular entity's position in a set of search results based on characteristics of a geographic area where the particular entity is located. The search process may obtain two or more polygons that are each associated with a geographic area and a characteristic of a geographic region. In one implementation, the search process may determine whether one or more entities are located within a blended polygon region. The searching process may modify an initial entity score that is associated with each of the one or more entities that are located within the blended polygon region. The searching process may generate an enhanced search result rankings based on the modified entity scores that may result in the promotion of one or more entities that initially appeared to be less relevant above one or more entities that initially appeared to be more relevant in the enhanced list of search results.

In some aspects, the subject matter embodied in this specification may be embodied in methods that may include the action of receiving one or more search parameters. Additional actions may include obtaining two or more sets of data that each represent a respective geographic area, the two or more sets of data including at least one set of data that is provided by a third party geographic data set provider, defining a particular geographic area to search based at least on the two or more sets of data that each represent a respective geographic area, identifying one or more entities that (i) are indicated as responsive to one or more of the search parameters, and (ii) are associated with the particular geographic area; and providing a representation of the entities for output.

Other versions may include corresponding systems, apparatus, and computer programs, configured to perform the actions of methods, encoded on computer storage devices These and other versions may each optionally include one or more of the following features. For instance, in one implementation, the one or more identified entities may include one or more apartments.

In the same, or different, implementation, defining a particular geographic area to search based at least on the two or more sets of data that each represent a respective geographic area may include identifying one or more areas of intersection between each of the obtained sets of data that each represent a respective geographic area.

In the same, or different, implementation, one or more of the obtained sets of data may be associated with a predetermined search result score modification factor. In the same, or different, implementation, the method may include associating a search result score modification factor with one or more of the obtained sets of data that represents a respective geographic area.

In the same, or different, implementation, the method may further include modifying a search result score associated with an entity based on the search result score modification factor that is associated with only one of the obtained sets of data that represents a respective geographic area. Alternatively, or in addition, the method may further include modifying a search results score associated with an entity based on two or more search result score modification factors that are each associated a particular obtained set of data that represents a respective geographic area.

In the same, or different, implementation, one or more sets of data in the obtained sets of data may include data identifying geographic areas that have low crime, geographic areas that have good schools, geographic areas that have public transportation, or geographic areas that are within a predetermined commute time.

The details of one or more implementations are set forth in the accompanying drawings and the description below. Other features and advantages will be apparent from the description and drawings, and from the claims.

WRITTEN DESCRIPTION

Figure 1:
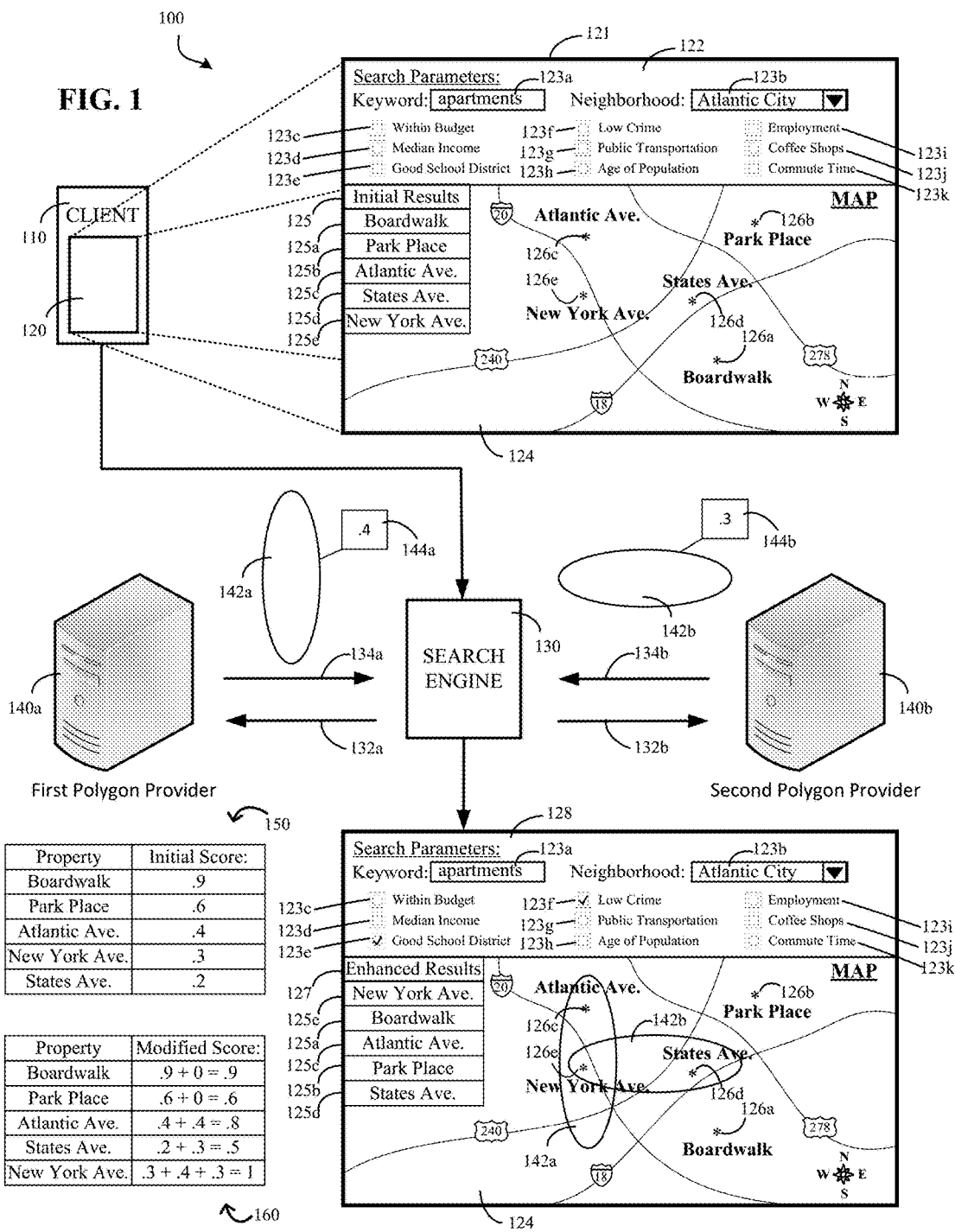
FIG. 1 is a diagram of an example of a system for performing blended polygon searching.

FIG. 1 is a diagram of an example of a system 100 for performing blended polygon searching.

A user of client device 110 may utilize a browser, or mobile application, to access a web application hosted by one or more servers to initiate performance of a blended polygon search. Performance of a blended polygon search may be initiated from a first user interface 121 of a web application. The user interface 121 may include, for example, a display of an initial set of search results 125 that lists entities that were retrieved based on the user's initial search parameters 122 of the keyword 123a "apartments" and the neighborhood 123b "Atlantic City." The initial set of search results may yield entities such as, for example, the apartments "Boardwalk" 125a, "Park Place" 125b, "Atlantic Ave." 125c, "States Ave." 125d, and "New York Ave." 125e. The location of one or more of the entities identified in the initial set of search results 125 may also be displayed via a graphical icon 126a, 126b, 126c, 126d, 126e on the map 124.

The initial set of search results 125 may ranked based on an initial entity score. The initial entity score for each entity in the initial set of search results is depicted in table 150. The initial entity score may be based on, for example, the level of demand associated with an entity. For instance, a high entity score may indicate that an entity is of high quality, and in high demand. Similarly, a low entity score may indicate that an entity is of low quality, and in low demand. In general, an entity with a higher entity score may be considered to be more relevant than an entity with a low entity score. For instance, with reference to the initial score of FIG. 1, it is clear that Boardwalk, with an initial score of "0.9," is a more relevant apartment to own/rent than New York Ave., with an initial score of "0.3." This is because, for example, many people may want to live at Boardwalk due to nice amenities, modern design, a friendly concierge, positive tenant feedback ratings, or the like. Accordingly, a typical search based solely on the initial search parameters "apartments" and "Atlantic City," and the initial score, may return Boardwalk as the top search result.

Table 150 provides the initial scores for the apartments that are responsive to the initial search parameters. Boardwalk is associated with the highest initial score "0.9," Park Place is associated with the next highest initial score "0.6," Atlantic Ave. is associated with the next highest initial score "0.4," New York Ave. is the next highest initial score "0.3," and States Ave. is the next highest initial score "0.2." Accordingly, the example of FIG. 1 that identifies a set of apartments that includes Boardwalk, Park Place, Atlantic Ave., New York Ave., and States Ave. as responsive to a received search parameters ranks the initial results in the order of Boardwalk, Park Place, Atlantic Ave., New York Ave., and States Ave., based on the initial score that is associated with each respective apartment.

A user of client device 110 may request enhanced search results by selecting one or more additional search parameters 123c, 123d, 123e, 123f, 123g, 123h, 123i, 123j, 123k. The additional search parameters may include, for example, one or more characteristics of a geographic location. For instance, a user of client device 110 may modify the user's initial entity search for "apartments" in "Atlantic City" by indicating that the user would like to identify apartments that are located in a "Good School District" in a part of Atlantic City that has "Low Crime." The user's request for enhanced search results that includes data indicative of a selection of the "Good School District" check box 123 and the "Low Crime" check box 124 may be transmitted to the search engine 130.

The search engine 130 may receive the request for enhanced search results. The search engine may parse the request for enhanced search results to obtain the data that is indicative of a selection of the "Good School District" check bock 123 and data that is indicative of a selection of the "Low Crime" check box 123. The search engine 130 may identify a polygon provider that may provide one or more polygons that are indicative of portions of Atlantic City that are associated with a "Good School District" and/or portions of Atlantic City that are associated with "Low Crime" areas. For instance, the search engine 132a may transmit a request 132a to a first polygon provider 140a for one or more polygons associated with areas of Atlantic City that include "Good School Districts." The first polygon provider may transmit 134a a polygon 142a to search engine 130. The polygon 142a may be of any shape, and may include a set of geographic data that identifies portions of Atlantic City that have "Good School Districts." Search engine 130 may make a similar request 132b to a second polygon provider 140b for one or more polygons that are associated with areas of Atlantic City that include "Low Crime" areas. The second polygon provider may transmit 134b a polygon 142b to search engine 130. The polygon 142b may be of any shape, and may include a set of geographic data that identifies portions of Atlantic City that have "Low Crime."

The polygons provided by a polygon provider may be associated with a search result score modification factor. The search result score modification factor may include a value that may be used to by a ranking engine to modify the initial entity score that is associated with a particular entity. For instance, the polygon 142a may be associated with a search result score modification factor 144a of "0.4." Similarly, for example, the polygon 142b may be associated a search result score modification factor 144b of "0.3". The initial entity score that is associated with one or more particular entities may be modified based on a particular polygon's search result score modification factor if it is determined that the one or more particular entities reside with the boundary established by the particular polygon. For instance, with reference to the example of FIG. 1, the apartment "Atlantic Ave." 126c is determined to fall within the polygon 142a. As a result, the ranking engine may boost "Atlantic Ave.'s" score by "0.4," based on the search result score modification factor of polygon 142a. Thus, in this example, "Atlantic Ave." may be associated with a modified entity score of 0.4+0.4=0.8 that may be used to rank "Atlantic Ave." in the enhanced search results.

The search engine 130 may use the received polygons 142a, 142b to define a geographic area that will searched. In one implementation, the search engine may identify a set of enhanced search results that only includes a set of one or more entities that are responsive to received search parameters, and determined to reside within a geographic boundary established by one or more of the received polygons. Alternatively, the search engine may identify a set of enhanced search results that are responsive to the received search parameters, and includes entities that reside inside and/or outside one or more of the geographic boundaries established by the received polygons 142a, 142b such as, for example, the set of enhanced search results 127 identified in user interface 128.

Defining a geographic area may include blending two or more polygons 142a, 142b that were received from one or more multiple polygon providers 140a, 140b. Blending two or more polygons 142a, 142b may include identifying areas of intersection between two or more received polygons 142a, 142b. An area of intersection between two or more received polygons 142a, 142b may exist when two are more polygons 142a, 142b are each associated with a set of geographic data that defines at least a portion of a geographic area that is common between at least a first polygon 142a and a second polygon 142. In one implementation, SQL functions may be used to perform this operation. Example functions for performing this operation include, for example, EncodedMultiPolygon, ConvertMultiPolygonToGeometry, STIntersection, and/or the like. Alternatively, or in addition, for example, other functions may be used to perform this operation.

In the example of FIG. 1, the entity "New York Ave." is located within an area of intersection between two blended polygons 142a, 142b. The process of blending two or more polygons 142a, 142b may be used to identify particularly relevant places for a user to live. For instance, a user may submit data indicative of one or more search parameters 123a, 123b, 123c, 123d, 123e, 123f, 123g, 123h, 123i. One or more of the search parameters may be indicative of a particular characteristic of a geographic location that the user is seeking in a place to live. One or more of the search parameters may be used to identify a particular polygon that corresponds to a geographic area that is associated with the particular characteristic of a geographic location that the user is seeking in a place to live. Blending two or more of these geographic areas may identify a particular geographic region that is associated with multiple features a user seeks in a place to live.

User interface 128 may be substantially similar to the user interface 121. However, the user interface 128 has been updated to display enhanced search results based on the user's selection of the "Good School District" check box 123 and the "Low Crime" check box 124. In response to the user's selection of the "Good School District" check box 123 and the "Low Crime" check box 124, the search engine obtained polygons 142a, 142b that correspond to each respective selection, generated a search space, identified one or more entities responsive to the user's search parameters, modified initial entity scores associated with each identified entity, and provided a list of enhanced search results for display via user interface 128. The generated search space may be visually displayed via user interface 128 by providing a graphical representation of the retrieved polygons 142a, 142b that may be displayed via user interface 128. Alternatively, the retrieved polygons 142a, 142b may be used in background processing in order to modify initial entity scores without the polygons 142a, 142b being displayed on the user interface 128.

The table 160 provides the modified entity score for each entity that was provided for inclusion in the enhanced search results 127. User interface 128 indicates that Atlantic Ave. 126c falls within the geographic region associated with polygon 142a. As a result, Atlantic Ave.'s initial score is modified using the search result score modification factor 144a "0.4" that is associated with polygon 144a. Similarly, user interface 128 indicates that States Ave. falls within the geographic region associated with polygon 142b. As a result, States Ave.'s initial score is modified using the search result score modification factor 144b "0.3". The modified scores for Atlantic Ave. and States Ave. is then "0.8" and "0.5," respectively. User interface 128 further indicates that New York Ave. is located within both polygon 142a and polygon 142b. As a result, New York Ave.'s initial score is modified using the search result score modification factor 144a of "0.4" and the search result score modification factor of "0.3". The modified score for New York Ave. is now 1.0. The initial scores for Boardwalk and Park Place remain unchanged, as neither Boardwalk nor Park Place reside within a geographic region that is identified by either polygon 142a or polygon 142b. Nonetheless, Boardwalk and Park Place are still included within the enhanced search results 127.

In this implementation, the search result score modification factor is used to modify the initial entity score by adding the search result score modification factor to the initial entity score. However, the present disclosure need not be so limited. Other ways of modifying the initial entity score using the search result score modification factor may include, for example, multiplying the initial entity score by the search result score modification factor, adding only a portion of the search result score modification factor to the initial entity score, or the like.

User interface 128 displays the enhanced search results 127 that are based on the modified scores shown in table 160. The same set of entities are provided in the enhanced results 127 as being responsive to the users search parameters as the set of entities provided in the initial results 125. However, the enhanced results 127 are provided in a different order that is based on the modified entity score shown in table 160. The modified entity scores are the result of modifications to the initial entity scores shown in table 150 based on the search result score modification factors that are associated with polygons 142a, 142b.

The modified scores result in New York Ave. 125e being promoted to the top of the search result list. New York Ave.'s 125e promotion in the search result rankings results because New York Ave. 125e was determined to reside within a blended polygon region. New York Ave. 125e satisfies the user's initial search parameters 122 of a keyword 123a "apartments" and neighborhood 123b "Atlantic City," while also meeting the additional search parameters of a "Good School District" 123e and "Low Crime" 123f. Though Boardwalk 125a and Park Place 125b appear to be relevant apartments, as evidenced by their high initial entity scores shown in table 150, the ranking engine determined that New York Ave. 125e is a more relevant apartment for the particular user of client device 110 based on the user's search parameters 123a, 123b, 123d, 123e. As a result, the ranking engine promotes New York Ave.'s 125e position in the enhanced results 127, based on New York Ave.'s modified entity score.

Figure 2:
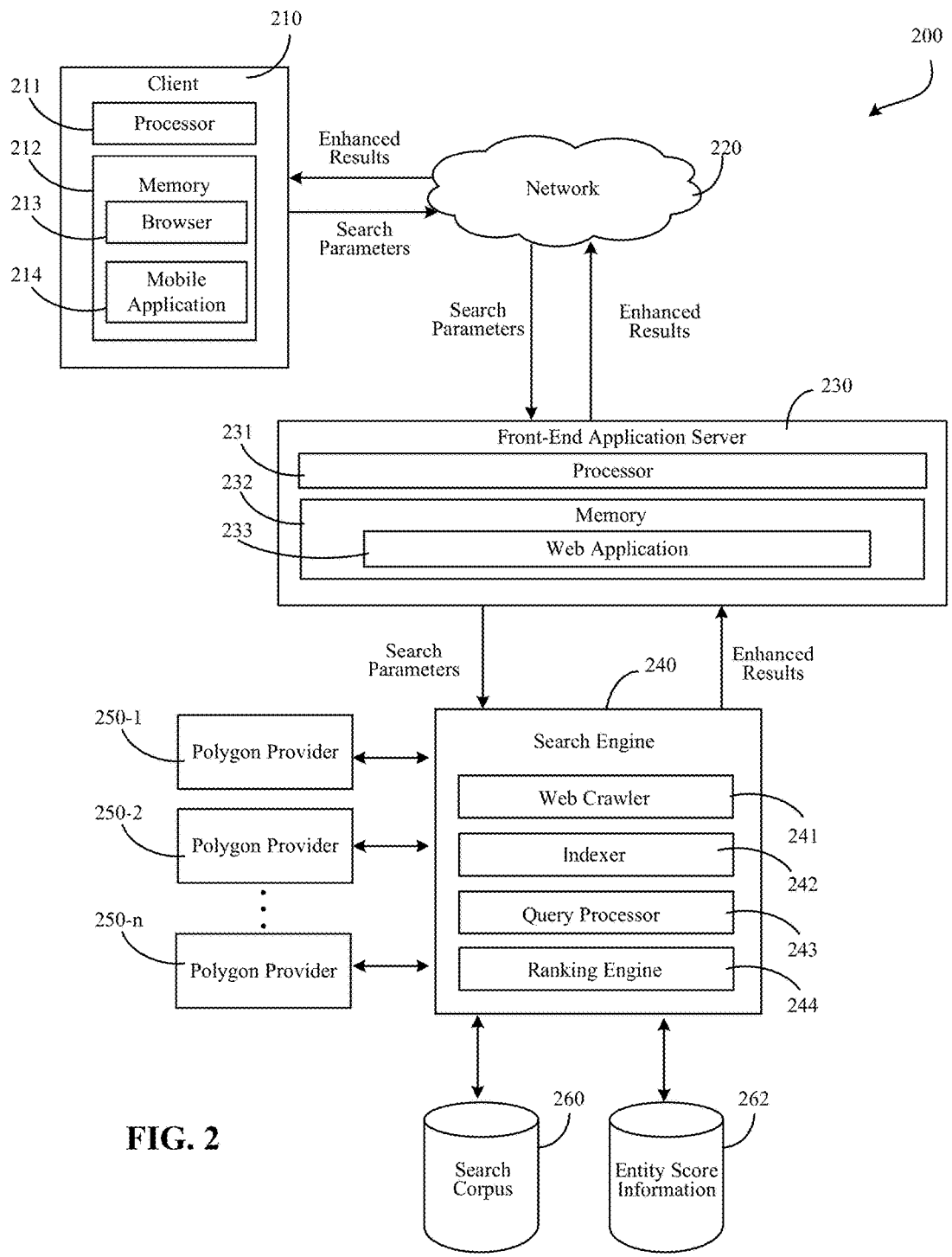
FIG. 2 is a block diagram of an example of a system for implementing blended polygon searching

FIG. 2 is a block diagram of an example of a system 200 for implementing blended polygon searching. The system 200 may include a client device 210, a network 220, a front-end application server 230, a search engine 240, one or more polygon providers 250-1, 250-2, 250-n, a search corpus database 260, and an entity score information database 262.

Client device 210 may be representative of one, or multiple, client devices. The client device 210 may include a mobile computing platform or a non-mobile computing platform. Mobile computing platforms may include, for example, a smartphone, tablet, laptop computer, or other thin client devices. Non-mobile computing platforms may include, for example, desktop computers, set top box entertainment systems, video game consoles, or the like. Client device 210 may be configured to communicate with front-end application server 230 via network 220 using one or more communication protocols.

The client device 210 of system 200 may include at least a processor 211 and a memory 212. The memory 212 may provide for the storage of computer program code associated with one or more applications installed on client 210. The applications may include, for example, a browser 213 or mobile application 214. Processor 211 may be configured to execute the stored computer program code in a manner that allows client 210 to realize the functionality provided by the applications. Processor 211 may also be configured to execute instructions to realize the functionality associated with any of the actions attributed to client 210 below.

The client 210 may be able to access one or more web based applications 233 hosted by front-end application server 230 via network 220 using browser 213. Such web based applications may include, for example, an application that facilitates using blended polygon searching to identify entities that may be available for sale, for lease, or that provide a particular service. An entity may include any item that may be available for sale or for lease such as, for example, a book, a clothing item, a motor vehicle, a consumer electronic item, a house, an apartment, or the like. Alternatively, an entity may include a party that provides a service such as, for example, a restaurant, a barber shop, a day care facility, a school, a doctor's office, a law office, a government agency, or the like. Web application 233 may utilize one or more back-end components in order to identify one or more particular entities using a blended polygon search. In certain instances, web application 233 may utilize the methods described in this specification to generate an enhanced set of search results that promote one or more entities based on a determination that an entity is located within the boundary of a geographic region defined by one or more polygons. A polygon may include a set of data that defines a geographic area. Such sets of data may include, for example, latitude and longitude, territorial boundaries, or the like.

A user may initiate a blended polygon search with client device 210 by interacting with one or more search fields provided by web application 233 via a browser 213. For instance, a user may interact with one or more user interface controls such as, for example, a text box, a drop down box, a check box, radio buttons, or the like in order to input one or more search parameters. Alternatively, or in addition, the user may instruct the client device 210 to transmit the search parameters to front-end application server 230 via network 220. In some implementations, however, mere selection of a user interface control such as, for example, a check box or radio button may initiate transmission of a search parameter to the front-end application server 230. Alternatively, or in addition, a user may input a search parameters by drawing one or shapes around a location of interest on a map provided by a graphical user interface. Client device 210 may then generate one or more search parameters to identify entities that may reside within geographic locations associated with the one or more shapes drawn by the user on the map provided by a graphical user interface, and transmit the search parameters to front-end application server 230. The front-end application server 230 may then forward the search parameters to one or more back-end data processing systems that may process the search parameters. The back-end system may obtain one or more polygons, define a geographic space to search, identify a set of search results responsive to the search parameters, rank each search result in the set of search results, and then return the set of search results that are responsive to the received parameters to the front-end application server 230. The front-end application server 230 may then forward the search results back to client device 210. Though the examples provided in this specification describe search terms and search results using English language words, the system and method provided by the specification may be used to facilitate search and retrieval in any language including, for example, English, Spanish, or the like The search results may be displayed on a graphical user interface associated with client device 210 in a variety of different ways that may assist a user in understanding and interpreting the search results. For instance, the search results may be displayed as a list of one or multiple entities, wherein each entity in the list is ordered according to a score calculated by one or more backend components of system 200 such as, for example, ranking engine 244. Alternatively, or in addition, the search results may be displayed by plotting one or multiple graphical icons on a map of a geographical area that each correspond to a particular entity identified as a search result that is responsive to received search parameters. The location of each graphical icon on the map may be indicative of the location of the corresponding entity. In certain instances, search results may be displayed as both a ranked list of entities in a first portion of the graphical user interface and as a plot of graphical icons on a map in a second portion of the graphical user interface. Other ways of displaying search results also fall within the scope of this specification.

Separate from browser 213, a client device 210 may also be able to use a mobile application 214 in order for a user of client device 210 to avail himself of the same, or similar, functionality that was described above as being provided by a web application 233 via browser 213. Mobile application 214 may include an executable software program that was previously downloaded from a mobile application provider. Mobile application 214 may be configured to relay commands input by a user such as, for example, search parameters to the front-end application server 230. After receiving search parameters from mobile application 214, the front-end application server 230 may request that one or more backend components process the search parameters, obtain one or more polygons, define a geographic space to search, identify one or more entities responsive to the search parameters, rank the search results, and return the ranked search results to mobile application 214, which may display the search results as a ranked list of entities, as plotted graphical icons on a map, or a combination thereof.

Network 220 may be configured to facilitate connectivity between a client device 210 and front-end application server 230. Client 210 and front-end application server 230 may be connected to network 220 via one or more wired, or wireless, communication links. Network 220 may include any combination of one or more types of public and/or private networks including but not limited to a local area network (LAN), wide area network (WAN), the Internet, a cellular data network, or any combination thereof.

Front-end application server 230 may include at least a processor 231 and a memory 232. The memory 232 may provide for the storage of computer program code associated with one or more applications hosted by front-end application server 230. The applications may include, for example, a web application 233 that may facilitate identification of one or more particular entities using a blended polygon search. Processor 231 may be configured to execute the stored computer program code in a manner that allows front-end application server 230 to realize the functionality provided by the applications. Processor 231 may also be configured to execute instructions to realize the functionality associated with any of the actions attributed to front-end application server 130 below.

Front-end application server 230 may serve as an interface between the client 210 and the back-end components of system 200 that may include, for example, a search engine 240, one or more polygon providers 250-1, 250-2, 250-*m*, search corpus database 260, and/or an entity score information database 262. Front-end application server 230 may be comprised of one or more server computers. Front-end application server 230 may be configured to receive commands from a client device 210, and translate those commands, if necessary, into a format that is compatible with one or more back-end network components. Front-end application server 230 may also employ network security applications such as, for example, a firewall, user authentication, subscription verification, or the like in an effort to supervise access to one or more back-end network components, if necessary.

Front-end application server 230 may also facilitate session management for each browsing session initiated by each respective client device 210 that is currently using a browser 213, or mobile application 214, to avail itself of the services provided by the web application 233. For instance, front-end application server 230 may employ functionality to associate an identifier with each query received by the front-end application server 230 from a particular client 210. The identifier may be passed as metadata that is associated with the search parameters to each back-end component of system 200. The search results obtained by the back-end components, and sent back to the front-end application server may also utilize metadata that includes the identifier. The front-end application server 230 may later utilize the identifier in order to associate ordered search results received from the search engine 240 with a query received from a particular client 210. The identifier may then be used to return the set of ordered search results to the client device 210 that initiated the query. The identifier may include a user identifier, device identifier, transaction identifier, or the like.

System 200 may also include a search engine 240. The search engine may be a location based search engine that may be configured to receive and execute search parameters that are associated with a location component. The location component of one or more search parameters may be based on a particular location that was input by a user via client device 210. The location component may be the location of the particular client device 210, or some other location that the user of client device 210 has input as an entity search parameter. Alternatively, or in addition, the location component may be a set of data that describes a geographic area that was obtained from one or more polygon providers 250-1, 250-2, 250-n. Alternatively, or in addition, the location component of the search query may be obtained by front-end application server 230, a back-end network component, or another network component associated with system 200 based on one or more attributes associated with a client device 210. For instance, one of the aforementioned network components may determine the current location of a client device 210. Alternatively, or in addition, the current location of a client device 210 may be provided to one or more network components of system 200 by a third party. Alternatively, or in addition, the location component may be determined based on locations that the client device 210 has recently traveled. The location component may include, for example, a neighborhood, a city, a state, a zip code, GPS coordinates, longitude and latitude coordinates, or the like.

The search engine 240 may include a web crawler 241, an indexer 242, a query processor 243, and a ranking engine 244. The search engine 240 may be hosted by one or multiple server computers. The server computer(s) hosting the search engine 240 may be the same server computer(s) that provide the front-end application server 230. Alternatively, however, the server computer(s) hosting the search engine 240 may be a different set of one or more server computer(s) that are configured to communicate with the front-end application server 230 via one or more public or private networks.

Web crawler 241 may be configured to traverse computers connected to a computer network such as, for example, the Internet, to scan and identify data associated with particular entities. For instance, web crawler 241 may scan computers associated with a computer network in order to identify web pages, or other files accessible via the computer network, that may include data associated with one or multiple entities that are currently being offered for sale or lease. Alternatively, or in addition, web crawler 241 may scan computers associated with a computer network in order to identify web pages, or other files accessible via the computer network, that may include data associated with one or multiple entities that are currently offering a particular service. The identified web pages, or a subset of the raw data associated therewith, may be stored in search corpus database 260. In some implementations, web crawler 241 may be autonomous software that is configured to periodically scan computer networks in order to identify new, or previously undiscovered, web pages or other network accessible files associated with entities that are currently being offered for sale, for lease, or that may provide a service. Alternatively, or in addition, the functionality of web crawler 241 may be performed by one or more operators of location based search engine 240. For instance, a group of one or more analysts may obtain raw data associated with an entity, and store the raw data in search corpus database 260. Alternatively, or in addition, it is contemplated that a party that offers an entity for sale, for lease, or that provides a service may also upload raw data associated with the entity to search corpus database 260.

The aggregated set of raw data stored in search corpus database 260 may comprise a wealth of data describing a wide spectrum of different entities. For instance, search corpus database 260 may include for each known entity, for example, the entity's name, the entity's location, a description of the entity, a value associated with the entity, or the like. The value for the entity may include, for example, the price of an entity that is being offered for sale or for lease. Alternatively, however, the value for an entity may include, for example, an entity rating. For instance, for an entity that offers a service such as, for example, Bob's Diner, the entity rating may include a feedback score associated with Bob's Diner based on customer experience. Such entity ratings may also be associated with entities for sale or for lease.

The search engine may use such ratings, and other data collected by crawler 241, in order to generate an initial entity score for entities identified in the search corpus database 260. The initial entity score for each entity may be stored in the entity score information database 262. The initial search score for each entity may include, for example, the score associated with an entity without modification by one or more search result score modification factors that are associated with one or more respective polygons. Alternatively, or in addition, the initial entity score may be based on, for example, the level of demand associated with an entity. Other types of raw data associated with an entity may be obtained via the data crawling process and stored in search corpus database 260.

Indexer 242 may be configured to analyze the raw data obtained during the crawling process in order to make the raw data searchable. For instance, indexer 242 may parse the raw data and extract one or more types of relevant data. For example, the indexer 242 may analyze the raw data to extract an entity's name, an entity's location, and a value associated with the entity. Indexer 242 may associate the extracted data with one or more keywords. The associated keywords may be compared to aspects of received search queries in order to determine whether the extracted data associated with the keywords is responsive to one or more received search parameters. Indexer 242 may generate a separate index for the search corpus database 260. Accordingly, indexer 242 may organize the raw data in this way, or other ways, in order to facilitate, a fast, efficient search.

Query processor 243 may be configured to receive one or more search parameters from front-end application server 230 that originated at a client device 210. The one or more search parameters may include one or more keywords input by a user into a field of the web application 233. In some aspects, query processor 243 may be configured to process the received search parameters, generate a search query based on the received search parameters, and then execute the search query against the index generated by indexer 242. Query processor 243 may alter the form of one or more aspects of the search query. For instance, query processor 243 may alter one or more keywords in order to expand or narrow the scope of a received query, as necessary. Such alterations to keywords of a query may include, for example, utilizing a root expander, replacing one or more characters with a wildcard character, insertion of one or more Boolean operators between keywords, dynamically altering location information associated with the query, or the like. Query processor 243 may also translate one or more aspects of the received query in order to make the query compatible with the index that is associated with the search corpus database 260. Query processor 243 may then execute the query against the search corpus database 260. Execution of the search query against the search corpus 260 may yield a set of one or multiple search results. The search results may identify, for example, a group of one or multiple links that are associated with entities that are responsive to the query received from client 210. The search result links may reference a web page that includes information associated with the particular entity that corresponds to reach respective link. The information included in the web page may be drawn from search corpus database 260. The set of search results may be substantially unordered, or otherwise arranged in an order that is not based on the best available deals. The search results identified by the query processor 243 in response to the received search query may then be passed to the ranking engine 244.

The query processor 243 may also determine that one or more of the received search parameters may be indicative of a request for a polygon. For instance, a user may input a selection using one or more interface controls associated with the web application 233 such as, for example, a check box or radio button that is associated with a characteristic of a geographic area. Characteristics of a geographic area may include, for example, neighborhoods within the user's budget, median income, good school district, low crime, public transportation, age of population, employment, coffee shops, commute time, walkability, or the like. In response to the receipt of data indicative of the selection of one or more characteristics of a geographic area, the query processor 243, or another component of search engine 240, may request one or more polygons from one or more polygon providers 250-1, 250-2, 250-n. The request for one or more polygons may include one or more characteristics of a geographic area received from the user as a search parameter. A polygon provider 250-1, 250-2, 250-n may use the one or more characteristics of a geographic area contained within the search engine's 240 request to search metadata associated with polygons in the polygon provider's polygon repository. Though a list of characteristics of a geographic area is provided, other types of characteristics of geographic areas fall within the scope of the present disclosure.

Each polygon provider 250-1, 250-2, 250-n may include a repository of polygons. A polygon may include a set of data that describes a geographic area. The set of data that describes a geographic area may include, for example, longitude and latitude coordinates, territorial boundaries, or the like. The geographic boundaries established by a polygon may be of any shape. In some instances, the polygons may be tagged with metadata to indicate that the particular geographic area identified by the polygon is associated with a particular characteristic of a geographic area. For instance, the polygon 142a described with reference to the example of FIG. 1 may be tagged with metadata to indicate that the geographic region described by polygon 142a is associated with a "Good School District." The metadata tags may be used to identify one or more particular polygons that are responsive to polygon requests received from the search engine 240. One or more polygon providers 250-1, 250-2, 250-n may provide one or more polygons to the search engine 240 in response to a request for polygon from the search engine 240. The search engine 240 may use polygons received from the polygon provider 250-1, 250-1, 250-n to define a geographic area to be searched. In some implementations, though the polygons may define a geographic area to be searched, query processor 243 may also search for properties that fall outside the boundary of one or more received polygons. In other implementations, the query processor's 243 search space may be limited to entities that fall within the boundaries of one or more received polygons.

One or more polygons in the polygon repository may be created and maintained by each respective polygon provider 250-1, 250-2, 250-n. Alternatively, or in addition, one or more users of system 200 may generate one or more custom polygons. A user may generate a custom polygon by using the user's finger, stylus, or other pointing device to draw a custom polygon on a map provided for display on the client device 210 by web application 233. The user may tag the custom polygon with one or more characteristics of a geographic area such as, for example, "Low Crime," "Good School District," "Public Transportation," "Coffee Shops," "Commute Time," or the like. Alternatively, or in addition, the user may generate a custom polygon by inputting the user's zip code, town, city, state, or other territorial boundary. The user may upload a custom polygon that the user created to one or more polygon providers 250-1, 250-2, 250-n. Alternatively, or in addition, the user may share the generated polygons with the user's contacts using one or more social networks. For instance, a user may post a custom polygon that is tagged with one or more characteristics of the geographic location corresponding to the custom polygon to the user's Facebook page, Twitter feed, or the like. Alternatively, or in addition, a user may share the custom polygon that is tagged with one or more characteristics of the geographic location corresponding to the custom polygon by transmitting the custom polygon via an SMS text message, MMS multimedia message, email, or the like.

One or more polygons in the polygon repository may be associated with a search result score modification factor. The search result score modification factor may be a value that can be used to alter an initial entity score of an entity. In one implementation, a search result score modification factor may include, for example, any value between 0.1 and 1.0. For instance, a polygon may be associated with a search result score modification factor of "0.4". In such instances, each entity that is identified responsive to search parameters input by a user, and determined to reside within the geographic boundaries of the polygon, may have their respective initial scores increased by the search result score modification factor of "0.4". The search result score modification factor may be assigned by the polygon provider, the polygon creator, or the polygon recipient. In a similar manner, an existing search result score modification factor may be adjusted by the polygon provider, the polygon creator, or the polygon recipient. Any received search result score modification factors may be provided to the ranking engine 244 so that the ranking engine 244 can use the result score modification factor to generate a modified entity score.

Search result score modification factors associated with a polygon may typically be positive values. This is because a polygon may typically be used to identify geographic areas that are associated with one or more characteristics that a user deems relevant. However, the present disclosure need not be so limited. For instance, in some aspects, the search result score modification factor may be a negative number between "−1.0" and "−0.1". Polygons that are associated with a negative search result score modification factor may identify characteristics of a geographic area that are not relevant. For example, a polygon may be created that indicates that a particular geographic region is associated with a "High Crime" rate, "Poor School District," or the like. Polygons that are associated with a negative search result score modification factor may be utilized in order demote the rank of a particular entity in a set of enhanced search results based on a determination that the particular entity is located within the polygon with a negative result score modification factor. Alternatively, or in addition, polygons that are associated with a negative search result score may be used to eliminate one or more entities from a particular geographic area from a set of enhanced search results.

Ranking engine 244 may be configured to perform a series of post processing operations on a set of identified search results. The post processing operations may determine the search result ranking that may be associated with each result in the set of search results based on the analysis of a score associated with each entity. In some instances, the ranking engine 244 may use information obtained by the web crawler 241 and stored in the search corpus database 260 to calculate an initial entity score for an entity. In other instances, the ranking engine 244 may calculate a modified entity score for an entity that is based on an initial entity score and one or more search result score modification factors. Ranking engine 244 may store initial entity scores and modified entity scores in an entity score information database 262. Once a set of search results have been identified, the ranking engine 244 may then order the set of search results, and transmit the set of results to the front-end application server 230 via one or more public or private networks. Front-end application server 230 may then provide the search results to client device 210 via network 220.

Ranking engine 244 may be configured to calculate an initial entity score for one or more entities. The initial entity score for one or more entities may be calculated before, or after, a particular entity is identified in a set of search results. Ranking engine 244 may calculate the initial entity score based on data obtained about the entity, and stored in search corpus 260. For instance, for entities that include apartments, an initial entity score may be calculated based on, for example, the level of demand associated with an entity. The initial entity score may be based on, for example, the level of demand associated with an entity. For instance, a high entity score may indicate that an entity is of high quality, and in high demand. Similarly, a low entity score may indicate that an entity is of low quality, and in low demand. In general, an entity with a higher entity score may be considered to be more relevant than an entity with a lower entity score.

Alternatively, or in addition, the initial entity score may be based on entity attributes. For instance, where the entity is an apartment, the initial entity score may be based on, for example, the property's amenities, modern design, a friendly concierge, rent, customer feedback ratings, location or the like. In such instances, an apartment with multiple amenities may be scored higher than a property with lower amenities. Alternatively, or in addition, apartments with a concierge may be scored higher than a property without a concierge. Alternatively, or in addition, the initial entity score for an entity may be influenced by paid advertisements. For instance, an advertiser could pay money in order to have ranking engine 244 create a higher initial entity score for the entity. The ranking engine 244 may then utilize initial entity scores to rank entities in a set of search results when the ranking engine does not receive any search result score modification factors. The lack of any search result score modification factors being received by the ranking engine 244 may be an indication that one or more polygons were not used to define a geographic space to be searched.

Ranking engine 244 may be configured to calculate a modified entity score based on the initial entity score for an entity and one or more search result score modification factors. Ranking engine 244 may determine that calculation of a modified entity score is necessary based on the receipt of one or more search result score modification factors. In one implementation, the ranking engine 244 may calculate a modified entity score by summing the initial entity score with each of the one or more search result score modification factors that are associated with a particular entity. A search result score modification factor may be associated with a particular entity if the particular entity is located within the boundaries of a particular polygon that corresponds to the search result score modification factor. The ranking engine 244 may use the modified entity score to rank a set of search results comprising multiple entities when one or more search result score modification factors are received by the ranking engine 244. Such a ranking may utilize a combination of modified entity scores and initial entity scores, as there may exist entities in a set of search results that did not reside within the boundaries of one or more received polygons. Ranking the set of search results based on one or more modified entity scores may create an enhanced set of search results.

The ranking engine 244 may transmit the set of ranked search results to the front-end application server 230. The front-end application server 230 may then transmit the set of ranked search results to the client device 210.

Figure 3:
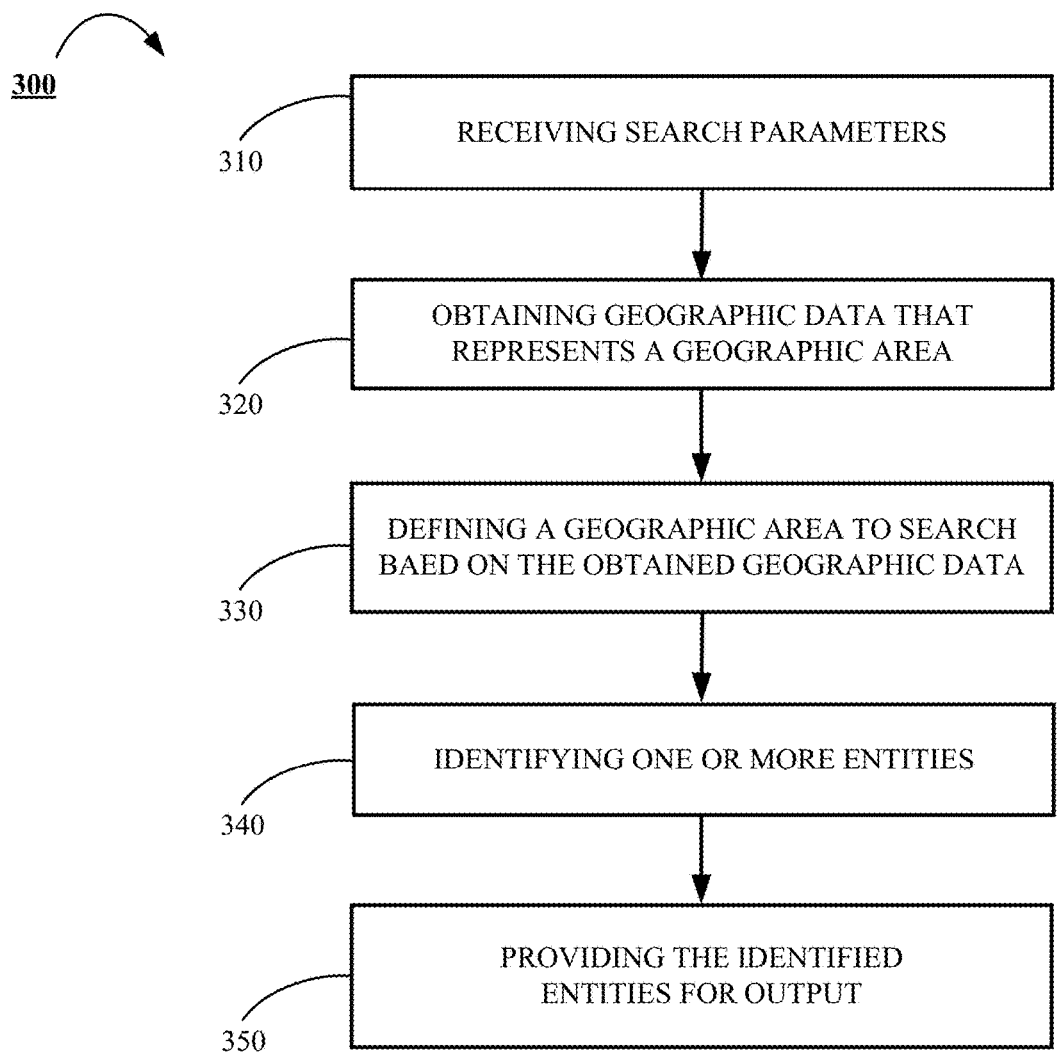
FIG. 3 is a flowchart of an example of a process that may be utilized to perform blended polygon searching.

FIG. 3 is a flowchart of an example of a process 300 that may be utilized to perform blended polygon searching.

The process 300 may begin when the search engine receives 310 one or more search parameters from a client device. The search parameters may include, for example, one or more keywords, a neighborhood, and/or one or more characteristics of a geographic area. Characteristics of a geographic area may include, for example, locations that are within the user's budget, median income, good school district, low crime, public transportation, age of population, employment, coffee shops, commute time, walkability, or the like.

The search engine may determine that one or more of the received search parameters includes characteristics of a geographic area. In response to the determination that the one or more received search parameters includes characteristics of a geographic area, the search engine may obtain 320 two or more polygons. The search engine may retrieve one or more polygons from an in-network polygon repository. Alternatively, or in addition, the search engine may retrieve one or more polygons from a polygon repository that is associated with a third party polygon provider. The request to retrieve the polygons may be based on, for example, the characteristics of a geographic area received in the search parameters. For instance, a received characteristic of a geographic area may include, for example, "Good School District." In such an instance, the search engine may request a polygon from a polygon provider, or an in-network polygon repository, that provides polygon data related to education information. In one implementation, tags associated with one or more polygons may be searched in order to identify one or more polygons associated with a tag that corresponds to education information and/or a "Good School District."

The search engine may use the two or more obtained polygons to define 330 a particular geographic area to be search. In one implementation, the search engine may only search for entities that are responsive to the search parameters, and also reside within a geographic boundary established by one or more of the received polygons. Alternatively, the search engine may search for entities that are responsive to the received search parameters, regardless of whether the entities reside inside and/or outside one or more of the geographic boundaries established by the obtained polygons.

Defining a particular geographic area to be searched may include blending two or more polygons that were received from one or more polygon providers. In one aspect, the one or more polygon providers may include one or more third party polygon providers, an in-network polygon provider, or a combination thereof. Blending two or more polygons may include identifying areas of intersection between two or more received polygons. An area of intersection between two or more received polygons may exist when two or more polygons are each associated with a set of geographic data that defines at least a portion of a geographic area that is common between at least a first polygon and a second polygon. The process of blending two or more polygons may be used to identify particularly relevant places for a user to live. This is because blending two or more of these geographic areas may identify a particular geographic region that is associated with multiple features a user seeks in a place to live.

The search engine may identify 340 one or more entities that are indicated as responsive to one or more of the search parameters. In one implementation, the search engine may process one or more received search parameters against a search corpus that stores an entity index in order to retrieve one or more entities. Alternatively, or in addition, the search engine may also identify one or more entities that are associated the particular geographic region defined by the obtained polygons. Identifying one or more entities that are associated with the particular geographic region may include, for example, only identifying one or more entities that reside within one or more of the obtained polygons. Alternatively, identifying one or more entities that are associated with the particular geographic region may include, for example, identifying one or more entities that reside within the boundaries of one or more polygons and one or more entities that do not reside within the boundaries of any polygon. The identified entities may be used to create a set of search results that may be ranked by a ranking engine.

The ranking engine may rank the set of search results using either an initial entity score or a modified entity score. The initial entity score may be used to rank one or more search results where no search result score modification factor was received by the ranking engine. Alternatively, or in addition, the initial entity score may be used to rank a particular entity in a set of search results where a search result score modification factor was received that did not correspond to the particular entity. The modified entity score may be used to rank a particular entity in a set of search results where a search result score modification factor was received by the ranking engine that corresponds to the particular entity. A search result score modification factor may correspond to the particular entity if the particular entity is located within a geographic regions that is associated with the polygon that corresponds to the search result score modification factor. The ranked set of search results that includes the identified entities may be provided 350 for output on the display of a client device.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve relevant results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve relevant results. As one example, the processes depicted in the accompanying figures do not necessarily require the particular order shown, or sequential order, to achieve relevant results. In certain implementations, multitasking and parallel processing may be advantageous. Other steps may be provided, or steps may be eliminated, from the described processes. Accordingly, other implementations are within the scope of the following claims.

The invention claimed is:
1. A computer-implemented method comprising:
receiving, by a search engine that is hosted by one or more first server devices, one or more search parameters from a user device, wherein the search parameters comprise a first user-selectable search parameter and a second user-selectable search parameter;
obtaining, by the search engine that is hosted by the one or more first server devices, two or more polygons, wherein each polygon of the two or more polygons is defined by a set of data that represents at least a portion of a geographic area, the two or more polygons including at least (i) a first polygon that is (a) based on the first user-selectable search parameter and (b) provided by one or more second server devices that are different than the one or more first server devices and (ii) a second polygon that is (a) based on the second user-selectable search parameter and (b) provided by one or more third server devices that are different than the one or more first servers and different than the one or more second servers, wherein the first polygon is associated with a first search result modification score and the second polygon is associated with a second search result modification score;
defining, by the search engine that is hosted by the one or more first server devices, a particular geographic area to search based at least on the two or more polygons, wherein defining the particular geographic area to search comprises:
determining, by the search engine that is hosted by the one or more first server devices, at least a portion of a geographic region where the first polygon and the second polygon overlap; and
identifying one or more entities that are responsive to the search parameters, wherein identifying the one or more entities comprises:
determining, by the search engine that is hosted by the one or more first server devices and based on an initial search result ranking score for each entity, an initial set of ranked entities that are responsive to the one or more search parameters;
determining, by the search engine that is hosted by the one or more first server devices, an enhanced set of search result rankings by adjusting the initial search result ranking score using the first search result modification score and the second search result modification score for each of the entities that is located in the overlapping geographic region that is defined by the intersection of the first polygon and the second polygon; and providing a representation of the one or more entities selected based on the enhanced set of search result rankings for output.

2. A system comprising:
one or more computers and one or more storage devices storing instructions that are operable, when executed by the one or more computers, to cause the one or more computers to perform operations comprising:
receiving, by a search engine that is hosted by one or more first server devices, one or more search parameters from a user device, wherein the search parameters comprise a first user-selectable search parameter and a second user-selectable search parameter;
obtaining, by the search engine that is hosted by the one or more first server devices, two or more polygons, wherein each polygon of the two or more polygons is defined by a set of data that represents at least a portion of a geographic area, the two or more polygons including at least (i) a first polygon that is (a) based on the first user-selectable search parameter and (b) provided by one or more second server devices that are different than the one or more first server devices and (ii) a second polygon that is (a) based on the second user-selectable search parameter and (b) provided by one or more third server devices that are different than the one or more first servers and different than the one or more second servers, wherein the first polygon is associated with a first search result modification score and the second polygon is associated with a second search result modification score;
defining, by the search engine that is hosted by the one or more first server devices, a particular geographic area to search based at least on the two or more polygons, wherein defining the particular geographic area to search comprises:
determining, by the search engine that is hosted by the one or more first server devices, at least a portion of a geographic region where the first polygon and the second polygon overlap; and
identifying one or more entities that are responsive to the search parameters, wherein identifying the one or more entities comprises:
determining, by the search engine that is hosted by the one or more first server devices and based on an initial search result ranking score for each entity, an initial set of ranked entities that are responsive to the one or more search parameters;
determining, by the search engine that is hosted by the one or more first server devices, an enhanced set of search result rankings by adjusting the initial search result ranking score using the first search result modification score and the second search result modification score for each of the entities that is located in the overlapping geographic region that is defined by the intersection of the first polygon and the second polygon; and
providing a representation of the one or more entities selected based on the enhanced set of search result rankings for output.

3. A non-transitory computer-readable medium storing software comprising instructions executable by one or more computers which, upon such execution, cause the one or more computers to perform operations comprising:
receiving, by a search engine that is hosted by one or more first server devices, one or more search parameters from a user device, wherein the search parameters comprise a first user-selectable search parameter and a second user-selectable search parameter;
obtaining, by the search engine that is hosted by the one or more first server devices, two or more polygons, wherein each polygon of the two or more polygons is defined by a set of data that represents at least a portion of a geographic area, the two or more polygons including at least (i) a first polygon that is (a) based on the first user-selectable search parameter and (b) provided by one or more second server devices that are different than the one or more first server devices and (ii) a second polygon that is (a) based on the second user-selectable search parameter and (b) provided by one or more third server devices that are different than the one or more first servers and different than the one or more second servers, wherein the first polygon is associated with a first search result modification score and the second polygon is associated with a second search result modification score;
defining, by the search engine that is hosted by the one or more first server devices, a particular geographic area to search based at least on the two or more polygons, wherein defining the particular geographic area to search comprises:
determining, by the search engine that is hosted by the one or more first server devices, at least a portion of a geographic region where the first polygon and the second polygon overlap; and
identifying one or more entities that are responsive to the search parameters, wherein identifying the one or more entities comprises:
determining, by the search engine that is hosted by the one or more first server devices and based on an initial search result ranking score for each entity, an initial set of ranked entities that are responsive to the one or more search parameters;
determining, by the search engine that is hosted by the one or more first server devices, an enhanced set of search result rankings by adjusting the initial search result ranking score using the first search result modification score and the second search result modification score for each of the entities that is located in the overlapping geographic region that is defined by the intersection of the first polygon and the second polygon; and
providing a representation of the one or more entities selected based on the enhanced set of search result rankings for output.

4. The computer-implemented method of claim 1, wherein the one or more identified entities include one or more apartments.

5. The computer-implemented method of claim 1, wherein two or more polygons include data identifying geographic areas that have low crime, geographic areas that have good schools, geographic areas that have public transportation, or geographic areas that are within a predetermined commute time.

6. The computer-implemented method of claim 1, wherein determining, by the search engine that is hosted by the one or more first server devices, an enhanced set of search result rankings by adjusting the initial search result ranking score using the first search result modification score and the second search result modification score comprises:
for each entity that is located within the overlapping geographic region that is defined by the intersection of the first polygon and the second polygon, adding the first search result modification score and the second search result modification score to the initial search result ranking score for the entity.

7. The computer-implemented method of claim 1, wherein determining, by the search engine that is hosted by the one or more first server devices, an enhanced set of search result rankings by adjusting the initial search result ranking score using the first search result modification score and the second search result modification score comprises:

for each entity that is located within the overlapping geographic region that is defined by the intersection of the first polygon and the second polygon, multiplying the initial search result score by the first search result modification score and the second search result modification score.

8. The computer-implemented method of claim 1, wherein the one or more second servers includes an in-network polygon repository that resides on the same network as the one or more servers hosting the search engine.

9. The computer-implemented method of claim 1, wherein the one or more third servers includes an out-of-network polygon repository that resides on a different network than the one or more servers hosting the search engine.

10. The system of claim 2, wherein determining, by the search engine that is hosted by the one or more first server devices, an enhanced set of search result rankings by adjusting the initial search result ranking score using the first search result modification score and the second search result modification score comprises:

for each entity that is located within the overlapping geographic region that is defined by the intersection of the first polygon and the second polygon, adding the first search result modification score and the second search result modification score to the initial search result ranking score for the entity.

11. The system of claim 2, wherein determining, by the search engine that is hosted by the one or more first server devices, an enhanced set of search result rankings by adjusting the initial search result ranking score using the first search result modification score and the second search result modification score comprises:

for each entity that is located within the overlapping geographic region that is defined by the intersection of the first polygon and the second polygon, multiplying the initial search result score by the first search result modification score and the second search result modification score.

12. The system of claim 2, wherein the one or more second servers includes an in-network polygon repository that resides on the same network as the one or more servers hosting the search engine.

13. The system of claim 2, wherein the one or more third servers includes an out-of-network polygon repository that resides on a different network than the one or more servers hosting the search engine.

14. The non-transitory computer-readable medium of claim 3, wherein determining, by the search engine that is hosted by the one or more first server devices, an enhanced set of search result rankings by adjusting the initial search result ranking score using the first search result modification score and the second search result modification score comprises:

for each entity that is located within the overlapping geographic region that is defined by the intersection of the first polygon and the second polygon, adding the first search result modification score and the second search result modification score to the initial search result ranking score for the entity.

15. The non-transitory computer-readable medium of claim 3, wherein determining, by the search engine that is hosted by the one or more first server devices, an enhanced set of search result rankings by adjusting the initial search result ranking score using the first search result modification score and the second search result modification score comprises:

for each entity that is located within the overlapping geographic region that is defined by the intersection of the first polygon and the second polygon, multiplying the initial search result score by the first search result modification score and the second search result modification score.

16. The non-transitory computer-readable medium of claim 3, wherein the one or more second servers includes an in-network polygon repository that resides on the same network as the one or more servers hosting the search engine.

17. The non-transitory computer-readable medium of claim 3, wherein the one or more third servers includes an out-of-network polygon repository that resides on a different network than the one or more servers hosting the search engine.

* * * * *